United States Patent
Tanimoto

(10) Patent No.: US 10,457,258 B2
(45) Date of Patent: *Oct. 29, 2019

(54) BRAKE CONTROL APPARATUS FOR VEHICLE

(71) Applicant: TOYOTA JIDOSHA KABUSHIKI KAISHA, Toyota-shi, Aichi-ken (JP)

(72) Inventor: Mitsutaka Tanimoto, Numazu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 159 days.

This patent is subject to a terminal disclaimer.

(21) Appl. No.: 15/664,216

(22) Filed: Jul. 31, 2017

(65) Prior Publication Data

US 2018/0043873 A1    Feb. 15, 2018

(30) Foreign Application Priority Data

Aug. 9, 2016   (JP) .................................. 2016-156845

(51) Int. Cl.
    *B60T 8/44*    (2006.01)
    *B60T 8/1755*  (2006.01)
    (Continued)

(52) U.S. Cl.
    CPC .............. *B60T 8/44* (2013.01); *B60T 8/1755* (2013.01); *B60T 8/1761* (2013.01);
    (Continued)

(58) Field of Classification Search
    CPC ...... B60T 8/44; B60T 8/1755; B60T 7/17552; B60T 8/1761; B60T 8/1764; B60T 8/246;
    (Continued)

(56) References Cited

U.S. PATENT DOCUMENTS

| | | |
|---|---|---|
| 5,221,126 A | 6/1993 | Inoue |
| 6,027,183 A | 2/2000 | Katayose et al. |

(Continued)

FOREIGN PATENT DOCUMENTS

| | | |
|---|---|---|
| JP | H10-258724 A | 9/1998 |
| JP | 2010-018193 A | 1/2010 |
| JP | 2015-136993 A | 7/2015 |

OTHER PUBLICATIONS

U.S. Appl. No. 15/664,607, filed Jul. 31, 2017 in the name of Mahbubur Rashid.

(Continued)

*Primary Examiner* — Thomas W Irvin
(74) *Attorney, Agent, or Firm* — Oliff PLC

(57) ABSTRACT

A brake control apparatus includes: a master cylinder that outputs a brake fluid at a master pressure; a master pressure changing device that can change the master pressure irrespective of an operation of a brake pedal; a brake actuator; and a control unit that executes antilock control by reducing a brake pressure of a target wheel. Modes of the antilock control include a normal mode and a pseudo mode. In the pseudo mode, the control unit operates the master pressure changing device such that the master pressure obtains a target value of the brake pressure of the target wheel, and changes the brake pressure of the target wheel in an interlocking manner with the master pressure. When the normal mode is unavailable, the control unit executes the antilock control in the pseudo mode.

18 Claims, 9 Drawing Sheets

US 10,457,258 B2
Page 2

(51) Int. Cl.
  *B60T 8/1761* (2006.01)
  *B60T 8/1764* (2006.01)
  *B60T 8/24* (2006.01)
  *B60T 8/40* (2006.01)
  *B60T 7/12* (2006.01)
  *B60T 13/14* (2006.01)
  *B60T 1/10* (2006.01)
  *B60T 7/22* (2006.01)
  *B60T 13/66* (2006.01)
  *F16D 61/00* (2006.01)

(52) U.S. Cl.
  CPC ........ *B60T 8/1764* (2013.01); *B60T 8/17552* (2013.01); *B60T 8/246* (2013.01); *B60T 8/4077* (2013.01); *B60T 1/10* (2013.01); *B60T 7/12* (2013.01); *B60T 7/22* (2013.01); *B60T 13/146* (2013.01); *B60T 13/662* (2013.01); *B60T 2201/02* (2013.01); *B60T 2250/03* (2013.01); *B60T 2270/402* (2013.01); *B60T 2270/60* (2013.01); *F16D 61/00* (2013.01)

(58) Field of Classification Search
  CPC . B60T 8/4077; B60T 1/10; B60T 7/12; B60T 7/22; B60T 13/146; B60T 13/662; B60T 2201/02; B60T 2250/03; B60T 2270/402; B60T 2270/60
  See application file for complete search history.

(56) References Cited

U.S. PATENT DOCUMENTS

| | | | |
|---|---|---|---|
| 6,219,610 B1 | 4/2001 | Araki | |
| 6,236,926 B1 | 5/2001 | Naitou | |
| 6,322,164 B1 * | 11/2001 | Sakamoto | B60T 8/3275 303/114.3 |
| 6,382,737 B1 | 5/2002 | Isono et al. | |
| 7,035,726 B2 | 4/2006 | Sakata | |
| 7,065,442 B2 * | 6/2006 | Sakata | B60T 8/1755 701/70 |
| 8,229,642 B2 * | 7/2012 | Post, II | B60G 17/0165 280/5.512 |
| 8,342,616 B2 * | 1/2013 | Sawada | B60T 8/1764 303/113.2 |
| 8,567,875 B2 * | 10/2013 | Sawada | B60T 8/1764 303/148 |
| 9,403,514 B2 * | 8/2016 | Takeuchi | B60T 13/66 |
| 9,623,853 B2 * | 4/2017 | Kim | B60T 8/4081 |
| 9,637,102 B2 * | 5/2017 | Drumm | B60T 7/042 |
| 9,744,957 B2 * | 8/2017 | Takeuchi | B60T 8/4077 |
| 2003/0074127 A1 | 4/2003 | Kin et al. | |
| 2004/0124701 A1 * | 7/2004 | Nihei | B60T 8/1755 303/163 |
| 2005/0206228 A1 | 9/2005 | Ohtsu | |
| 2008/0208427 A1 | 8/2008 | Matsuno et al. | |
| 2009/0072615 A1 * | 3/2009 | Oosawa | B60T 8/3275 303/113.1 |
| 2009/0248269 A1 * | 10/2009 | Yasui | B60T 8/17552 701/74 |
| 2013/0226410 A1 * | 8/2013 | Narita | B60T 8/1764 701/41 |
| 2015/0112568 A1 | 4/2015 | Hirota | |
| 2015/0127226 A1 * | 5/2015 | Takeuchi | B60T 13/66 701/48 |
| 2018/0043869 A1 | 2/2018 | Tanimoto | |
| 2018/0056953 A1 * | 3/2018 | Kato | B60T 7/12 |

OTHER PUBLICATIONS

Feb. 8, 2019 Office Action issued to U.S. Appl. No. 15/664,607.
Aug. 1, 2019 Notice of Allowance issued in U.S. Appl. No. 15/664,607.

* cited by examiner

BRAKE CONTROL APPARATUS FOR VEHICLE

INCORPORATION BY REFERENCE

The disclosure of Japanese Patent Application No. 2016-156845 filed on Aug. 9, 2016 including the specification, drawings and abstract is incorporated herein by reference in its entirety.

BACKGROUND

1. Technical Field

The present disclosure relates to a brake control apparatus for a vehicle. In particular, the present disclosure relates to a brake control apparatus that executes antilock control of a wheel.

2. Description of Related Art

A braking device for a vehicle is disclosed in Japanese Patent Application Publication No. 2015-136993 (JP 2015-136993 A). The braking device for the vehicle includes a master cylinder, a servo pressure generator, and a brake actuator. The servo pressure generator generates a servo pressure irrespective of an operation of a brake pedal by a driver. The master cylinder is operated on the basis of the servo pressure and outputs a brake fluid at a master pressure that corresponds to the servo pressure to the brake actuator. The brake actuator distributes the brake fluid, which is output from the master cylinder, to a wheel cylinder of each wheel. In addition, the brake actuator can individually control a pressure of the brake fluid, which is supplied to the wheel cylinder of each of the wheels.

Antilock control for preventing locking of the wheel during braking has been known. In a related art, the antilock control has been executed by individually controlling a brake pressure of a target wheel by using the brake actuator.

SUMMARY

In the cases where the antilock control using the brake actuator is unavailable and thus the execution of the antilock control is abandoned, safety is degraded.

The present disclosure provides a technique capable of executing antilock control even when antilock control using the brake actuator is unavailable.

A first aspect of the present disclosure provides a brake control apparatus for a vehicle. The brake control apparatus according to the first aspect includes: a master cylinder configured to output a brake fluid at a master pressure; a master pressure changing device configured to change the master pressure irrespective of an operation of a brake pedal; a brake actuator configured to supply the brake fluid output from the master cylinder to a wheel cylinder of each of wheels and that can control a brake pressure of the brake fluid supplied to the wheel cylinder; and a control unit configured to execute antilock control of preventing locking of a target wheel by reducing the brake pressure of the target wheel irrespective of the operation of the brake pedal during braking. Modes of the antilock control include a normal mode and a pseudo mode. The control unit is configured to: in the normal mode, operate the brake actuator to obtain a target value of the brake pressure of the target wheel; in the pseudo mode, operate the master pressure changing device such that the master pressure obtains the target value, and change the brake pressure of the target wheel in an interlocking manner with the master pressure; and execute the antilock control in the pseudo mode when the normal mode is unavailable.

According to the above configuration, even when the normal mode using the brake actuator is unavailable, the antilock control can be executed in the pseudo mode. Thus, compared to the related art, an opportunity and a period to execute the antilock control are increased, and safety is improved.

In the first aspect, the brake actuator may include a pump, and the control unit may be configured to execute the antilock control in the pseudo mode when the pump cannot be used.

According to the above configuration, even when the pump provided in the brake actuator is unavailable, the antilock control can be executed in the pseudo mode.

In the first aspect, the brake actuator may include: an input node that receives the brake fluid output from the master cylinder; a booster valve that is provided between the input node and the wheel cylinder for each of the wheels; a reduction valve that is provided between the wheel cylinder and a reservoir for each of the wheels; and a pump that is configured to causes the brake fluid to return from the reservoir to the input node.

In the above configuration, in the pseudo mode, all the wheels may be the target wheels, and the control unit may be configured to reduce the brake pressures by opening the booster valves and closing the reduction valves for all the wheels and reducing the master pressure.

According to the above configuration, all the wheels can be set as the target wheels in the pseudo mode. In this case, the antilock control in the pseudo mode is simplified.

In the above configuration, the booster valve may be of a normally open type. The reduction valve may be of a normally closed type.

According to the above configuration, an opening/closing operation of the booster valve and the reduction valve is no longer necessary in the pseudo mode.

In the first aspect, a wheel other than the target wheel may be a non-target wheel, and in the pseudo mode, the control unit may be configured to reduce the brake pressure of the target wheel while maintaining the brake pressure of the non-target wheel, by opening the booster valve for the target wheel, closing the reduction valve for the target wheel, closing the booster valve for the non-target wheel, and reducing the master pressure In the above configuration, the control unit may be configured to set at least one of the wheels as the target wheel and execute the antilock control when a slip amount or a slip rate of the at least one of the wheels exceeds a threshold.

According to the above configuration, the brake pressure of the target wheel can be reduced while the brake pressure of the non-target wheel is maintained as is. In this way, the antilock control can be executed only for the necessary wheels.

In the first aspect, in the pseudo mode, the control unit may be configured to set all the wheels as the target wheel and execute the antilock control when a locking condition is satisfied, the locking condition may be that at least one of the wheels shows a locking sign, and the locking sign may be that a slip amount or a slip rate exceeds a threshold.

According to the above configuration, because all the wheels are the target wheels, the antilock control in the pseudo mode is simplified.

In the above configuration, the locking condition may include that at least one rear wheel shows the locking sign.

According to the above configuration, spinning can be avoided, and stability can thereby be increased.

In the above configuration, the locking condition may include that at least one front wheel signs the locking sign.

According to the above configuration, a state where steering becomes less effective can be avoided, and the stability can thereby be increased.

In the first aspect, the locking condition may not include that only one of right and left front wheels shows the locking sign and the locking condition may further include that both of the right and left front wheels show the locking sign.

According to the above configuration, a further large braking force can be secured.

In the first aspect, when the vehicle travels straight, the locking condition may not include that only one of right and left front wheels shows the locking sign and the locking condition may include that both of the right and left front wheels show the locking sign, and when the vehicle turns, the locking condition may include that at least one of the right and left front wheels shows the locking sign.

According to the above configuration, a characteristic with a higher priority can be obtained in accordance with a situation of the vehicle.

In the first aspect, when the vehicle travels straight, the locking condition may not include that only one of right and left front wheels shows the locking sign and the locking condition may include that both of the right and left front wheels show the locking sign, and when the vehicle turns, the locking condition may not include that only an inner wheel of the right and left front wheels shows the locking sign and the locking condition may include that an outer wheel of the right and left front wheels shows the locking sign.

According to the above configuration, turnability and the braking force during turning can be realized in a well-balanced manner.

In the first aspect, the vehicle may include an automatic drive device configured to execute automatic drive control, and when the automatic drive device executes track control of the vehicle, the locking condition may include that at least one of front wheels shows the locking sign.

According to the above configuration, even when the antilock control in the pseudo mode is executed, the automatic drive device can favorably execute the track control of the vehicle.

In the first aspect, when the vehicle travels on a split µ road, the locking condition may not include that only the wheel on a low µ side shows the locking sign and the locking condition may include that the wheel on a high µ side shows the locking sign.

According to the above configuration, when the vehicle travels on the split µ road, the further large braking force can be secured.

In the above configuration, the control unit may configured to: monitor a yaw rate of the vehicle; and operate the master pressure changing device to reduce the master pressure when the yaw rate exceeds a reference value.

According to the above configuration, the stability on the split µ road is secured.

In the first aspect, the vehicle may include an automatic drive device configured to execute automatic drive control, and when executing the antilock control in the pseudo mode, the control unit may be configured to request at least one of increasing a distance between vehicles, reducing a vehicle speed, notifying a driver, and prohibiting resuming of the automatic drive control to the automatic drive device.

According to the above configuration, the automatic drive control, for which the pseudo mode is taken into consideration, is realized.

A second aspect of the present disclosure provides a brake control apparatus for a vehicle. The brake control apparatus according to the second aspect includes: a master cylinder configured to output a brake fluid at a master pressure; a master pressure changing device configured to change the master pressure irrespective of an operation of a brake pedal; a brake actuator configured to supply the brake fluid output from the master cylinder to a wheel cylinder of each of wheels and control a brake pressure of the brake fluid supplied to the wheel cylinder; and a control unit configured to execute antilock control of preventing locking of a target wheel by reducing the brake pressure of the target wheel irrespective of the operation of the brake pedal during braking, the control unit being configured to execute the antilock control in a pseudo mode when a pump provided in the brake actuator is unavailable, and operate the master pressure changing device such that the master pressure obtains a target value of the brake pressure of the target wheel, and change the brake pressure of the target wheel in an interlocking manner with the master pressure in the pseudo mode.

According to the second aspect, even when the pump provided in the brake actuator is unavailable, the antilock control can be executed in the pseudo mode. Thus, compared to the related art, an opportunity and a period to execute the antilock control are increased, and safety is improved.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

A description will be made on an embodiment of the present disclosure with reference to the accompanying drawings.

1. Schematic Configuration of Vehicle

Figure 1:
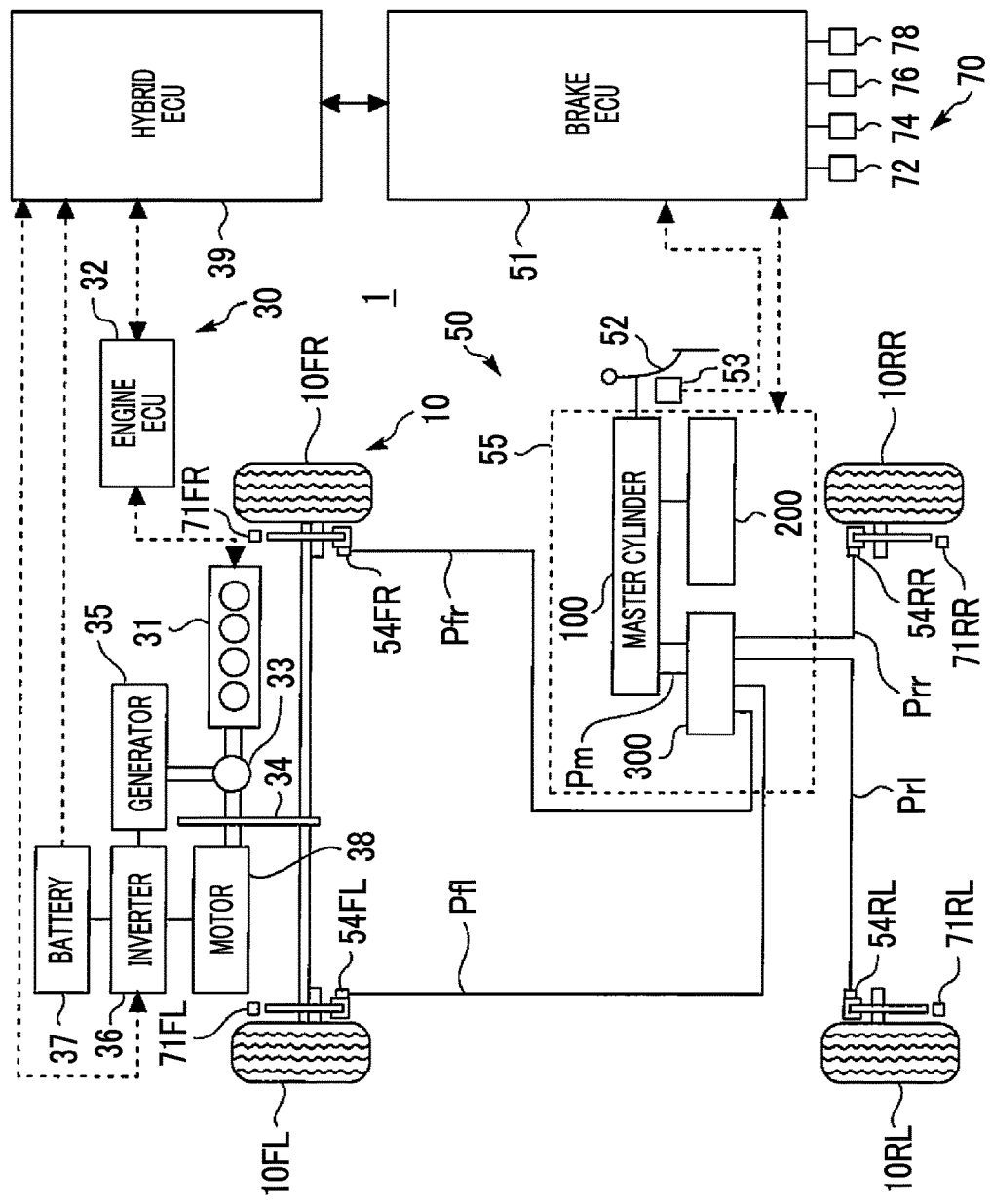
FIG. 1 is a schematic view of a configuration example of a vehicle according to an embodiment of the present disclosure.

FIG. 1 is a schematic view of a configuration example of a vehicle 1 according to the embodiment of the present disclosure. The vehicle 1 includes wheels 10, a drive control apparatus 30, a brake control apparatus 50, and a sensor group 70.

1-1. Wheels 10

The wheels 10 includes a front left wheel 10FL, a front right wheel 10FR, a rear left wheel 10RL, and a rear right wheel 10RR.

1-2. Drive Control Apparatus 30

The drive control apparatus 30 includes an engine 31, an engine electronic control unit (ECU) 32, a power split mechanism 33, a power transmission mechanism 34, a generator 35, an inverter 36, a battery 37, a motor 38, and a hybrid ECU 39.

The engine 31 is a power source. The engine ECU 32 controls an operation of the engine 31. The power split mechanism 33 distributes drive power generated by the engine 31 to the power transmission mechanism 34 and the generator 35. The power transmission mechanism 34 transmits the drive power to drive wheels (the front left wheel 10FL and the front right wheel 10FR in this example). The generator 35 generates alternate current (AC) power by using the received drive power. The inverter 36 converts the AC power, which is generated by the generator 35, to direct current (DC) power and supplies the DC power to the battery 37 to charge the battery 37.

The motor 38 is the other power source. The inverter 36 converts the DC power, which is discharged from the battery 37, to the AC power and supplies the AC power to the motor 38 to execute drive control of the motor 38. Drive power generated by the motor 38 is transmitted to the drive wheels via the power transmission mechanism 34.

The motor 38 also functions as means for generating a regenerative braking force. More specifically, when neither the engine 31 nor the motor 38 generates the drive power during a travel of the vehicle 1, rotational forces of the drive wheels are transmitted to the motor 38 via the power transmission mechanism 34. In this case, the motor 38 works as a generator, and rotational resistance thereof during power generation serves as a braking force applied to the drive wheels. The inverter 36 converts the AC power that is generated by the regenerative power generation of the motor 38 to the DC power, and supplies the DC power to the battery 37 to charge the battery 37.

The hybrid ECU 39 executes hybrid drive control that uses the two power sources of the engine 31 and the motor 38. More specifically, the hybrid ECU 39 generates an instruction to the engine ECU 32 and controls the drive power generation by the engine 31. In addition, the hybrid ECU 39 controls the inverter 36 to control the drive power generation by the motor 38. Furthermore, the hybrid ECU 39 controls the inverter 36 to execute control of the regenerative brake (regenerative control). Moreover, the hybrid ECU 39 monitors a state of charge of the battery 37 and controls the inverter 36 to control charging/discharging of the battery 37.

1-3. Brake Control Apparatus 50

The brake control apparatus 50 includes a brake ECU 51, a brake pedal 52, a stroke sensor 53, wheel cylinders 54FL, 54FR, 54RL, 54RR, and a brake pressure generator 55.

The brake ECU 51 is a control unit that controls an operation of the brake control apparatus 50. The brake pedal 52 is an operation member that is used by a driver for a braking operation. The stroke sensor 53 detects a stroke amount (an operation amount) of the brake pedal 52. The stroke sensor 53 sends information on the detected stroke amount to the brake ECU 51.

The wheel cylinders 54FL, 54FR, 54RL, 54RR are respectively provided in the front left wheel 10FL, the front right wheel 10FR, the rear left wheel 10RL, and the rear right wheel 10RR. The braking forces generated on the front left wheel 10FL, the front right wheel 10FR, the rear left wheel 10RL, and the rear right wheel 10RR are respectively determined by pressures of a brake fluid supplied to the wheel cylinders 54FL, 54FR, 54RL, 54RR. Hereinafter, the pressures of the brake fluid supplied to the wheel cylinders 54FL, 54FR, 54RL, 54RR will respectively be referred to as brake pressures Pfl, Pfr, Prl, Prr.

The brake pressure generator 55 supplies the brake fluid to the wheel cylinders 54FL, 54FR, 54RL, 54RR and generates the brake pressures Pfl, Pfr, Prl, Prr. The brake pressure generator 55 also has a function of variably controlling each of the brake pressures Pfl, Pfr, Prl, Prr.

Here, although the brake pedal 52 is coupled to the brake pressure generator 55, an operation of the brake pressure generator 55 does not have to be directly correlated with an operation of the brake pedal 52. For example, a case where the above-described regenerative brake is used will be considered. When the driver depresses the brake pedal 52, the stroke sensor 53 sends the information on the stroke amount of the brake pedal 52 to the brake ECU 51. The brake ECU 51 computes the requested braking force by the driver on the basis of the stroke amount. Then, the brake ECU 51 sends information on the requested braking force to the hybrid ECU 39. The hybrid ECU 39 executes the regenerative control on the basis of the requested braking force to generate the regenerative braking force. The hybrid ECU 39 sends information on the currently generated regenerative braking force to the brake ECU 51. The brake ECU 51 subtracts the regenerative braking force from the requested braking force to compute a target friction braking force. This target friction braking force is the braking force that should be borne by the brake control apparatus 50 (the brake pressure generator 55). The brake ECU 51 controls the operation of the brake pressure generator 55 so as to generate the brake pressures Pfl, Pfr, Prl, Prr corresponding to the target friction braking force.

Just as described, the brake pressure generator 55 according to this embodiment is configured to control the brake pressures Pfl, Pfr, Prl, Prr by at least following an instruction from the brake ECU 51. In other words, the brake pressure generator 55 can control the brake pressures Pfl, Pfr, Prl, Prr irrespective of the operation of the brake pedal 52. The brake ECU 51 can control the operation of the brake pressure generator 55 not only for the above-described regenerative brake but also for various applications.

Note that the brake ECU 51 is a microcomputer including a processor, memory, and an input/output interface. The brake ECU 51 receives detection information from various sensors through the input/output interface and sends the instruction to the brake pressure generator 55. The memory stores a control program. When the processor executes the control program, a function of the brake ECU 51 is realized.

1-4. Sensor Group 70

The sensor group 70 includes wheel speed sensors 71FL, 71FR, 71RL, 71RR, a steering angle sensor 72, a vehicle speed sensor 74, a lateral acceleration sensor 76, a yaw rate sensor 78, and the like. The wheel speed sensors 71FL, 71FR, 71RL, 71RR respectively detect rotational speeds of the front left wheel 10FL, the front right wheel 10FR, the rear left wheel 10RL, and the rear right wheel 10RR. The steering angle sensor 72 detects a steering angle. The vehicle speed sensor 74 detects a speed of the vehicle 1. The lateral acceleration sensor 76 detects lateral acceleration (lateral G) acting on the vehicle 1. The yaw rate sensor 78 detects an actual yaw rate generated in the vehicle 1.

2. Configuration Example of Brake Control Apparatus

Hereinafter, a detailed description will be made on a configuration of the brake control apparatus 50, in particular, a configuration of the brake pressure generator 55. As shown in FIG. 1, the brake pressure generator 55 includes a master cylinder 100, a master pressure changing device 200, and a brake actuator 300.

The master cylinder 100 is a brake fluid supply source. The master cylinder 100 pushes out the brake fluid or draws the brake fluid in response to an external force. A pressure of the brake fluid that is output from the master cylinder 100 will hereinafter be referred to as a "master pressure Pm".

The master pressure changing device 200 applies the external force to the master cylinder 100 irrespective of the operation of the brake pedal 52. When the master pressure changing device 200 increases the external force, the brake fluid is pushed out of the master cylinder 100, and the master pressure Pm is boosted. On the other hand, when the master pressure changing device 200 reduces the external force, the brake fluid is drawn into the master cylinder 100, and the master pressure Pm is reduced. That is, the master pressure changing device 200 can change the master pressure Pm irrespective of the operation of the brake pedal 52. An operation of this master pressure changing device 200 is controlled by the brake ECU 51.

The brake actuator 300 is provided between the master cylinder 100 and the wheel cylinders 54FL, 54FR, 54RL, 54RR. The brake actuator 300 distributes the brake fluid, which is output from the master cylinder 100, to the wheel cylinders 54FL, 54FR, 54RL, 54RR and generates the brake pressures Pfl, Pfr, Prl, Prr. Each of the brake pressures Pfl, Pfr, Prl, Prr is basically changed by the master pressure Pm. However, the brake actuator 300 can individually control the brake pressures Pfl, Pfr, Prl, Prr. An operation of this brake actuator 300 is also controlled by the brake ECU 51.

Hereinafter, a description will be made on specific configuration examples of the master cylinder 100, the master pressure changing device 200, and the brake actuator 300.

2-1. Master Cylinder 100

Figure 2:
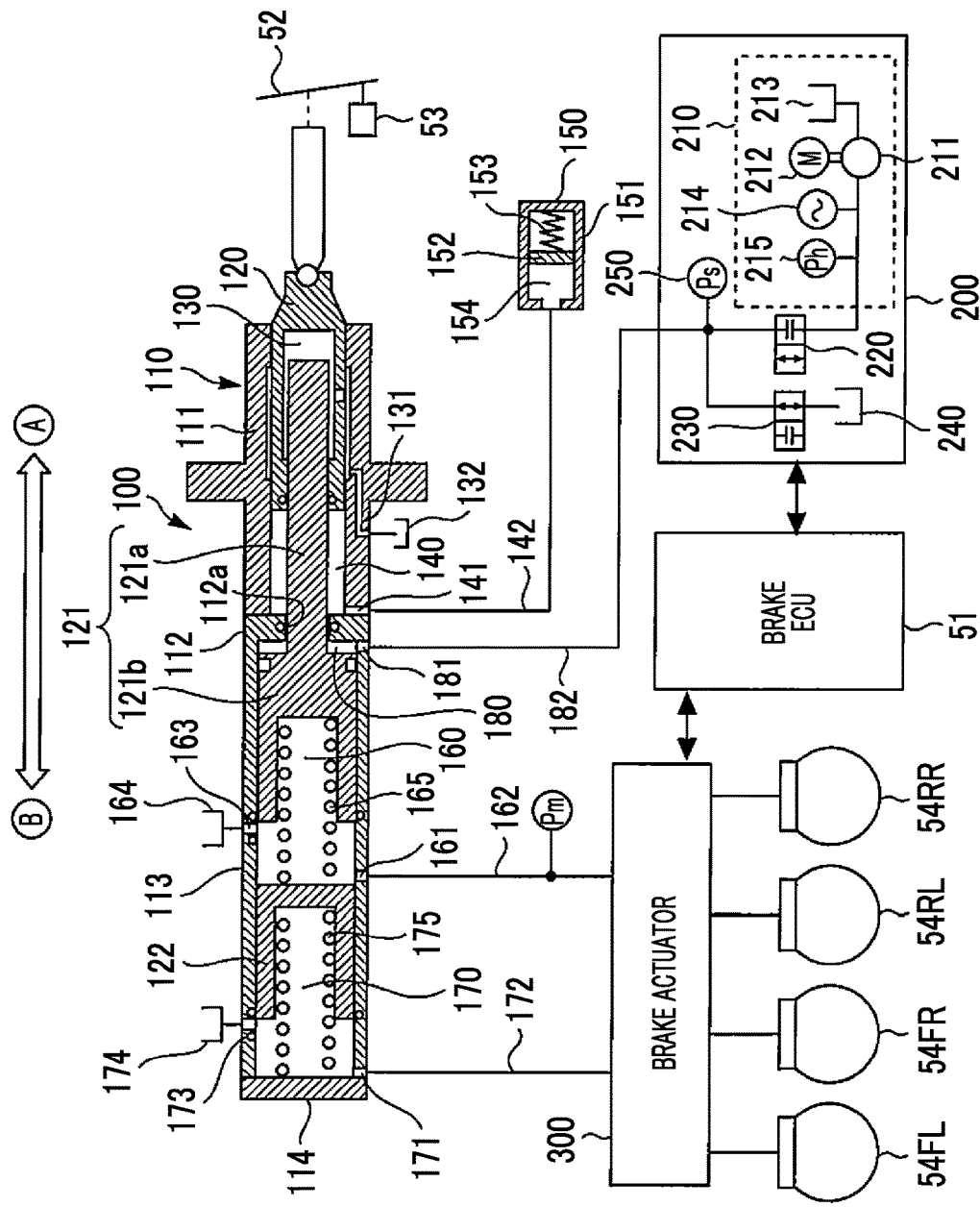
FIG. 2 is a view of a configuration example of a brake control apparatus according to the embodiment of the present disclosure.

FIG. 2 shows the configuration example of the master cylinder 100. The master cylinder 100 includes a cylinder 110 with one opened end and the other closed end. In the following description, an opened side of the cylinder 110 will be referred to as an "A side", and a closed side thereof will be referred to as a "B side".

The cylinder 110 is configured by including an input cylinder 111, a partition wall 112, an output cylinder 113, and a bottom section 114, and these are sequentially arranged from the A side to the B side. One end of the input cylinder 111 corresponds to an opening of the cylinder 110, and the bottom section 114 corresponds to a closure of the cylinder 110. The partition wall 112 is arranged between the input cylinder 111 and the output cylinder 113. The partition wall 112 has a through hole 112a. An inner diameter of the through hole 112a is smaller than an inner diameter of the input cylinder 111 and an inner diameter of the output cylinder 113.

An input piston 120, a first output piston 121, and a second output piston 122 are arranged in the cylinder 110. These input piston 120, first output piston 121, and second output piston 122 are sequentially arranged from the A side to the B side along an axial direction of the cylinder 110.

In detail, the input piston 120 is arranged to be slidable along an inner wall of the input cylinder 111. This input piston 120 is coupled to the brake pedal 52 via an operation rod. The input piston 120 moves longitudinally in an interlocking manner with the operation of the brake pedal 52 by the driver.

The first output piston 121 has a projected section 121a on the A side and a piston section 121b on the B side. The projected section 121a extends from the output cylinder 113 to an inside of the input cylinder 111 through the through hole 112a of the partition wall 112. However, the projected section 121a is not coupled to the input piston 120 and thus is not influenced by the movement of the input piston 120. As shown in FIG. 2, a separation space 130 is formed between the input piston 120 and the projected section 121a. This separation space 130 is connected to a reservoir 132 via a passage 131.

A space surrounded by the input cylinder 111, the partition wall 112, a tip of the input piston 120, and the projected section 121a is a reaction force chamber 140. The reaction force chamber 140 is filled with the brake fluid. The reaction force chamber 140 is connected to a stroke simulator 150 via a port 141 and a pipe 142.

The stroke simulator 150 includes a cylinder 151, a piston 152, a spring 153, and a fluid chamber 154. One end of the cylinder 151 is opened, and the other end thereof is closed. The piston 152 is arranged to be slidable along an inner wall of the cylinder 151. In addition, the piston 152 is coupled to a closure of the cylinder 151 via the spring 153. The fluid chamber 154 is formed between the opening of the cylinder 151 and the piston 152 and is filled with the brake fluid. This fluid chamber 154 is connected to the reaction force chamber 140 via the pipe 142 and the port 141.

When the driver depresses the brake pedal 52, the input piston 120 moves in a B direction. Then, the brake fluid flows from the reaction force chamber 140 to the fluid chamber 154 of the stroke simulator 150, and the piston 152 is pushed in a closure direction of the cylinder 151. A fluid pressure in the reaction force chamber 140 is boosted in response to an elastic force of the spring 153 generated at the time, and the driver receives the elastic force as a reaction force. The elastic force of the spring 153, that is, the reaction force is proportional to displacement of the input piston 120. It can be said that the stroke simulator 150 artificially creates a sense of the operation at a time when the driver depresses the brake pedal 52.

The piston section 121b of the first output piston 121 is arranged to be slidable along an inner wall of the output cylinder 113. A space surrounded by the output cylinder 113, the piston section 121b, and the second output piston 122 is a first master chamber 160. The first master chamber 160 is filled with the brake fluid. The first master chamber 160 is connected to the brake actuator 300 via a port 161 and a pipe 162. In addition, the first master chamber 160 is connected to a reservoir 164 via a port 163. A spring 165 is arranged in the first master chamber 160 in a manner to connect the piston section 121b and the second output piston 122.

The second output piston 122 is arranged to be slidable along the inner wall of the output cylinder 113. A space surrounded by the output cylinder 113, the second output piston 122, and the bottom section 114 of the cylinder 110 is a second master chamber 170. The second master chamber 170 is filled with the brake fluid. The second master chamber 170 is connected to the brake actuator 300 via a port 171 and a pipe 172. In addition, the second master chamber 170 is connected to a reservoir 174 via a port 173. A spring 175 is arranged in the second master chamber 170 in a manner to connect the second output piston 122 and the bottom section 114.

A state where each of the spring 165 and the spring 175 does not have the elastic force is an initial state. FIG. 2 shows the initial state. The pressure of the brake fluid in the initial state corresponds to a reservoir pressure.

As shown in FIG. 2, the piston section 121b of the first output piston 121 separates from the partition wall 112, and a servo chamber 180 is formed therebetween. The servo chamber 180 is filled with the brake fluid. A pressure of the brake fluid in the servo chamber 180 will hereinafter be referred to as a "servo pressure Ps". The servo chamber 180 is connected to the master pressure changing device 200 via a port 181 and a pipe 182. The master pressure changing device 200 feeds the brake fluid to the servo chamber 180 or draws in the brake fluid from the servo chamber 180.

When the master pressure changing device 200 feeds the brake fluid to the servo chamber 180, the servo pressure Ps is boosted, and the first output piston 121 moves in the B direction. When the first output piston 121 moves in the B direction, communication between the first master chamber 160 and the reservoir 164 is blocked, and the brake fluid pressure in the first master chamber 160 is boosted. As a result, the brake fluid is output from the first master chamber 160 to the pipe 162.

Due to the boosted fluid pressure in the first master chamber 160, the second output piston 122 simultaneously moves in the B direction in an interlocking manner with the first output piston 121. When the second output piston 122 moves in the B direction, communication between the second master chamber 170 and the reservoir 174 is blocked, and the brake fluid pressure in the second master chamber 170 is boosted. As a result, the brake fluid is output from the second master chamber 170 to the pipe 172.

On the other hand, when the master pressure changing device 200 draws in the brake fluid from the servo chamber 180, the servo pressure Ps is reduced. As a result, the first output piston 121 and the second output piston 122 moves in an A direction, and the brake fluid pressures in the first master chamber 160 and the second master chamber 170 are reduced. At this time, the brake fluid is drawn into the first master chamber 160 from the pipe 162, and the brake fluid is drawn into the second master chamber 170 from the pipe 172. When the first output piston 121 and the second output piston 122 return to positions in the initial state, the first master chamber 160 is connected to the reservoir 164 again, and the second master chamber 170 is connected to the reservoir 174 again.

Each of the pressures of the brake fluids in the first master chamber 160 and the second master chamber 170 is the above-described master pressure Pm. The master pressure Pm is substantially equal to the servo pressure Ps in the servo chamber 180. The servo pressure Ps is boosted and reduced in accordance with a supply state of the brake fluid from the master pressure changing device 200. In other words, the master pressure Pm can be changed by the master pressure changing device 200.

Note that the configuration of the master cylinder 100 is not limited to the configuration shown in FIG. 2. For example, the master cylinder as disclosed in JP 2015-136993 A may be used. In addition, when necessary, a mode in which the operation of the brake pedal 52 is directly correlated with a change in the master pressure Pm may be used for the master cylinder 100.

2-2. Master Pressure Changing Device 200

FIG. 2 shows a configuration example of the master pressure changing device 200. The master pressure changing device 200 includes a high-pressure fluid source 210, a booster valve 220, a reduction valve 230, a reservoir 240, and a pressure sensor 250.

The high-pressure fluid source 210 includes a hydraulic pump 211, a motor 212, a reservoir 213, an accumulator 214, and a pressure sensor 215. The hydraulic pump 211 is driven by the motor 212, suctions the brake fluid from the reservoir 213, and boosts the pressure of the brake fluid. The accumulator 214 accumulates the brake fluid, the pressure of which is boosted. The pressure sensor 215 detects a pressure Ph of the brake fluid that is accumulated in the accumulator 214. The brake ECU 51 monitors the pressure Ph, which is detected by the pressure sensor 215, and controls the motor 212 such that the pressure Ph becomes equal to or higher than a specified value.

The booster valve 220 is provided between the pipe 182, which is connected to the servo chamber 180, and the high-pressure fluid source 210. Meanwhile, the reduction valve 230 is provided between the pipe 182 and the reservoir 240. The booster valve 220 is of a normally closed (NC) type, and the reduction valve 230 is of a normally open (NO) type. When the booster valve 220 is opened and the reduction valve 230 is closed, the high-pressure brake fluid is fed to the servo chamber 180, and the servo pressure Ps and the master pressure Pm can thereby be boosted. On the other hand, when the booster valve 220 is closed and the reduction valve 230 is opened, the brake fluid is drawn from the servo chamber 180, and the servo pressure Ps and the master pressure Pm can thereby be reduced.

The pressure sensor 250 detects the pressure of the brake fluid in the pipe 182, that is, the servo pressure Ps. Information on the servo pressure Ps, which is detected by the pressure sensor 250, is sent to the brake ECU 51. The brake ECU 51 controls opening/closing of the booster valve 220 and the reduction valve 230 such that the servo pressure Ps obtains a target value.

Note that the configuration of the master pressure changing device 200 is not limited to the configuration thereof shown in FIG. 2. Any configuration can be adopted as long as the master pressure Pm can be changed by following the instruction from the brake ECU 51. For example, the servo pressure generator disclosed in JP 2015-136993 A may be used as the master pressure changing device 200. Alternatively, the master pressure Pm can be changed by using a vacuum servo device that uses negative pressure of an engine intake system or a vacuum pump, or a booster device. In such a case, the vacuum servo device or the booster device corresponds to the master pressure changing device 200.

2-3. Brake Actuator 300

Figure 3:
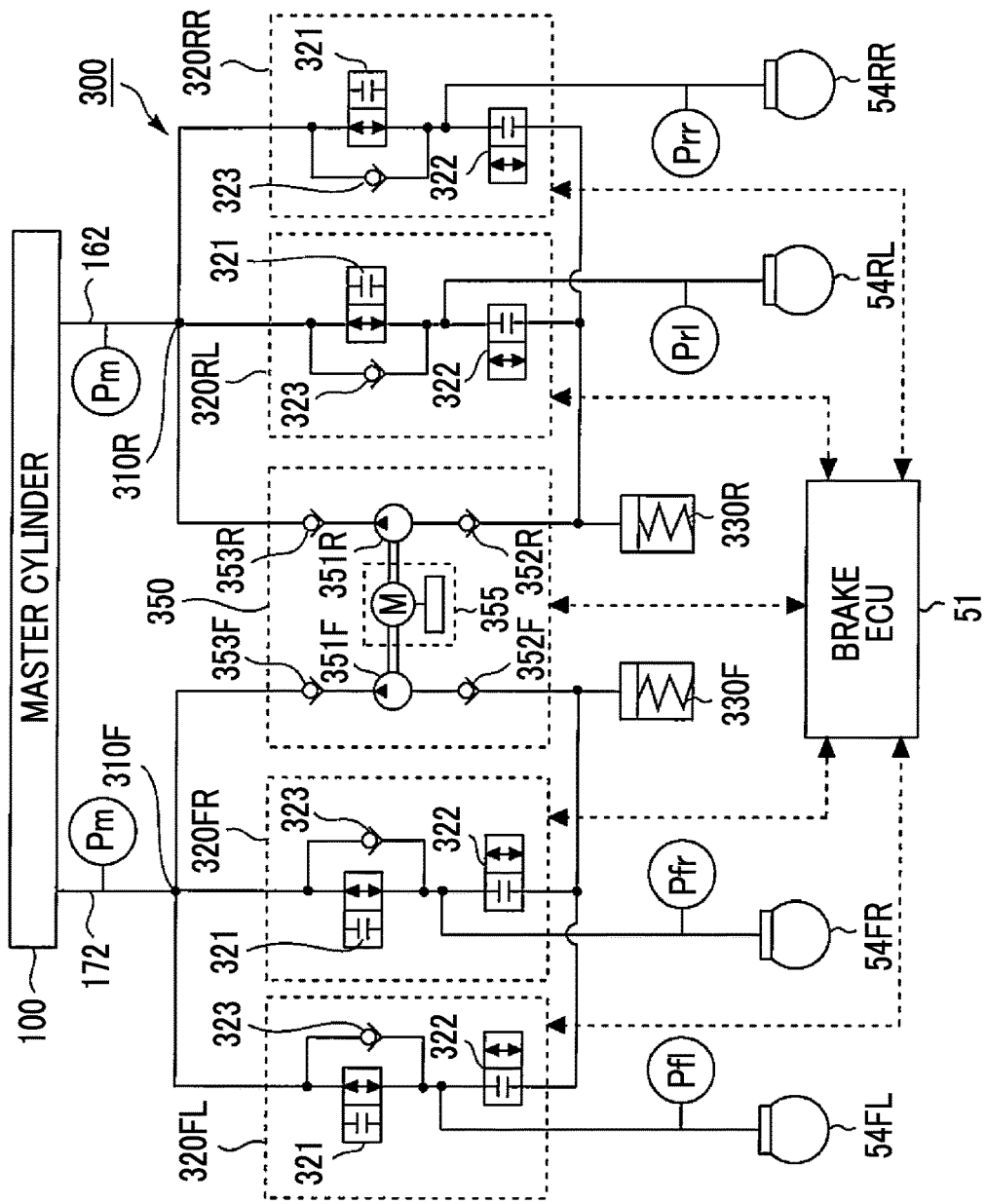
FIG. 3 is a view of a configuration example of a brake actuator according to the embodiment of the present disclosure.

FIG. 3 shows a configuration example of the brake actuator 300. The brake actuator 300 includes input nodes 310F, 310R, valve units 320FL, 320FR, 320RL, 320RR, reservoirs 330F, 330R, and a pump unit 350.

The input node 310F is connected to the second master chamber 170 of the master cylinder 100 via the pipe 172. The input node 310F receives the brake fluid that is output from the second master chamber 170. The input node 310R is connected to the first master chamber 160 of the master cylinder 100 via the pipe 162. The input node 310R receives the brake fluid that is output from the first master chamber 160.

The valve units 320FL, 320FR, 320RL, 320RR are respectively provided for the wheel cylinders 54FL, 54FR, 54RL, 54RR. More specifically, the valve unit 320FL is provided between the input node 310F and the wheel cylinder 54FL. The valve unit 320FR is provided between the input node 310F and the wheel cylinder 54FR. The valve unit 320RL is provided between the input node 310R and the wheel cylinder 54RL. The valve unit 320RR is provided between the input node 310R and the wheel cylinder 54RR.

Each of the valve units 320FL, 320FR, 320RL, 320RR includes a booster valve 321, a reduction valve 322, and a check valve 323. The booster valve 321 and the reduction valve 322 are electromagnetic valves (solenoid valves), for example.

A description will representatively be made on the valve unit 320FL. The booster valve 321 is provided between the input node 310F and the wheel cylinder 54FL. The reduction valve 322 is provided between the wheel cylinder 54FL and the reservoir 330F. For example, the booster valve 321 is of the NO type, and the reduction valve 322 is of the NC type. The check valve 323 is connected in a manner to only permit a flow of the brake fluid from the wheel cylinder 54FL to the input node 310F. In the case where the master pressure Pm becomes lower than a brake pressure Pfl when the booster valve 321 is closed, the brake fluid flows through the check valve 323, and the brake pressure Pfl is reduced.

The brake ECU 51 can variably control the brake pressure Pfl of the wheel cylinder 54FL by controlling an operation of such a valve unit 320FL. More specifically, the brake ECU 51 can boost the brake pressure Pfl within a range that is equal to or lower than the master pressure Pm by opening the booster valve 321 and closing the reduction valve 322. On the other hand, the brake ECU 51 causes the brake fluid to flow from the wheel cylinder 54FL to the reservoir 330F by closing the booster valve 321 and opening the reduction valve 322, and can thereby reduce the brake pressure Pfl. The brake ECU 51 can variably control the brake pressure Pfl by controlling opening/closing of the booster valve 321 and the reduction valve 322.

The same applies to the other valve units 320FR, 320RL, 320RR. In cases of the valve units 320RL, 320RR, the "input node 310F" is switched to the "input node 310R", and the "reservoir 330F" is switched to the "reservoir 330R".

The pump unit 350 is configured to cause the brake fluid to return from the reservoirs 330F, 330R to the input nodes 310F, 310R, respectively, by following the instruction from the brake ECU 51. In detail, the pump unit 350 includes pumps 351F, 351R, check valves 352F, 352R, check valves 353F, 353R, and a motor unit 355.

The pump 351F is provided between the reservoir 330F and the input node 310F, and is configured to cause the brake fluid to return from the reservoir 330F to the input node 310F. The check valve 352F is connected in a manner to only permit a flow of the brake fluid from the reservoir 330F to the pump 351F. The check valve 353F is connected in a manner to only permit a flow of the brake fluid from the pump 351F to the input node 310F. This check valve 353F prevents application of the high-pressure brake fluid to the pump 351F.

Similarly, the pump 351R is provided between the reservoir 330R and the input node 310R, and is configured to cause the brake fluid to return from the reservoir 330R to the input node 310R. The check valve 352R is connected in a manner to only permit a flow of the brake fluid from the reservoir 330R to the pump 351R. The check valve 353R is connected in a manner to only permit a flow of the brake fluid from the pump 351R to the input node 310R. This check valve 353R prevents the application of the high-pressure brake fluid to the pump 351R.

The motor unit 355 executes drive control of the pumps 351F, 351R. More specifically, the motor unit 355 includes: a motor that drives the pumps 351F, 351R; and a motor controller that controls an operation of the motor. The motor controller receives a drive command from the brake ECU 51, and issues a motor drive command that corresponds to the received drive command. Then, the motor controller supplies the motor drive command to the motor and thereby drives the motor and the pumps 351F, 351R. By driving the pumps 351F, 351R, the brake fluid can return from the reservoirs 330F, 330R to the input nodes 310F, 310R, respectively.

The pump unit 350 has a self-detection function of detecting that the pumps 351F, 351R are not actuated normally. When detecting that the pumps 351F, 351R are not actuated normally, the pump unit 350 outputs an error signal to the brake ECU 51. For example, when the motor fails, the pumps 351F, 351R are not actuated normally. The motor controller receives motor rotational state information from a sensor attached to the motor, compares the motor drive command and the motor rotational state information, and can thereby determine whether the motor is normally actuated. When the motor is not actuated normally, the motor controller outputs the error signal to the brake ECU 51.

Note that the configuration of the brake actuator 300 is not limited to the configuration shown in FIG. 3. Any configuration can be adopted as long as the brake actuator 300 can individually control the brake pressures Pfl, Pfr, Prl, Prr by following the instruction from the brake ECU 51. For example, such a configuration may be adopted that a master cut valve is provided between each of the input nodes 310F, 310R and the master cylinder 100 and the brake pressures Pfl, Pfr, Prl, Prr can be boosted by driving the pumps 351F, 351R.

3. Two Modes of Automatic Braking Control

The brake ECU 51 executes "automatic braking control" in which the braking force is changed irrespective of the operation of the brake pedal 52. According to this embodiment, as modes of the automatic braking control, two types of a "first mode" and a "second mode" of the automatic braking control are provided. Hereinafter, a detailed description will be made on each of the first mode and the second mode.

Note that, in the following description, brake pressures of the front left wheel 10FL, the front right wheel 10FR, the rear left wheel 10RL, and the rear right wheel 10RR will respectively mean the brake pressures Pfl, Pfr, Prl, Prr of the wheel cylinders 54FL, 54FR, 54RL, 54RR. In addition, valve units for the front left wheel 10FL, the front right wheel 10FR, the rear left wheel 10RL, and the rear right wheel 10RR will respectively mean the valve units 320FL, 320FR, 320RL, 320RR, which are respectively connected to the wheel cylinders 54FL, 54FR, 54RL, 54RR.

Of the front left wheel 10FL, the front right wheel 10FR, the rear left wheel 10RL, and the rear right wheel 10RR, the wheel, the brake pressure of which is changed, will be referred to as a "target wheel 10T". The valve unit for the target wheel 10T will be referred to as a "valve unit 320T". The brake pressure of the target wheel 10T will be referred to as a "brake pressure Pt". The wheel other than the target wheel 10T will be referred to as a "non-target wheel 10NT". The valve unit for the non-target wheel 10NT will be referred to as a "valve unit 320NT". The brake pressure of the non-target wheels 10NT will be referred to as a "brake pressure Pnt".

3-1. First Mode

Figure 4:
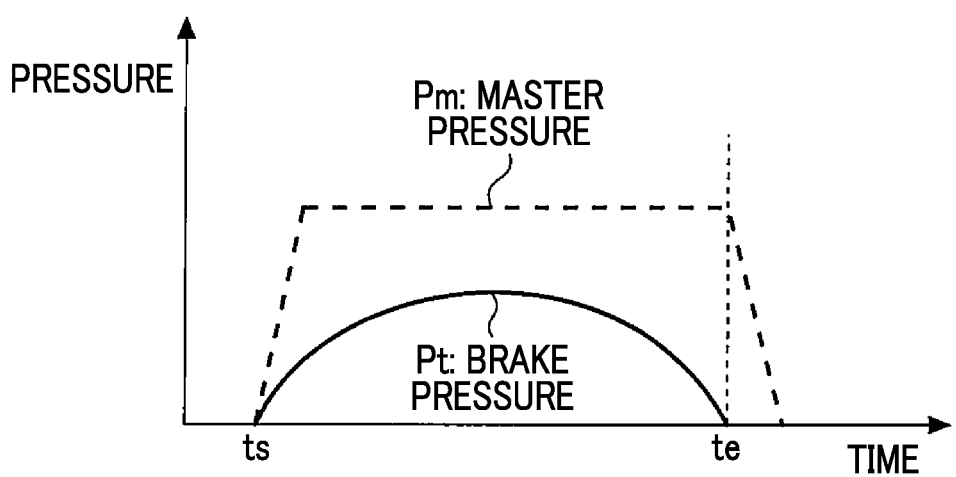
FIG. 4 is a timing chart that illustrates a first mode of automatic braking control according to the embodiment of the present disclosure.

FIG. 4 is a timing chart that shows the master pressure Pm and the brake pressure Pt of the target wheel 10T in the first mode. A horizontal axis represents time, and a vertical axis represents pressure. The automatic braking control for the target wheel 10T is executed in a period from time is to time te.

The brake ECU 51 operates the master pressure changing device 200 and boosts the master pressure Pm to certain extent. Meanwhile, based on the detection information received from the sensor group 70, the brake ECU 51 computes a target value of the brake pressure Pt of the target wheel 10T that is required for the automatic braking control. The target value will hereinafter be referred to as a "target brake pressure". The brake ECU 51 operates the brake actuator 300 in a manner to obtain the target brake pressure.

More specifically, in regard to the non-target wheel 10NT, the brake ECU 51 closes the booster valve 321 and the reduction valve 322 of the valve unit 320NT. In this way, the brake pressure Pnt of the non-target wheel 10NT is not influenced by the master pressure Pm and is maintained as is. Meanwhile, in regard to the target wheel 10T, the brake ECU 51 controls an operation of the valve unit 320T in a manner to obtain the target brake pressure. More specifically, the brake pressure Pt can be boosted by opening the booster valve 321 and closing the reduction valve 322. On the other hand, the brake pressure Pt can be reduced by closing the booster valve 321 and opening the reduction valve 322. By controlling opening/closing of the booster valve 321 and the reduction valve 322, the brake pressure Pt can be controlled at the target brake pressure.

As shown in FIG. 4, the first mode has a characteristic that the brake pressure Pt of the target wheel 10T is not changed in an interlocking manner with the master pressure Pm. That is, in the first mode, the brake ECU 51 changes the brake pressure Pt of the target wheel 10T in a manner not to interlock with the master pressure Pm by operating the brake actuator 300.

3-2. Second Mode

Figure 5:
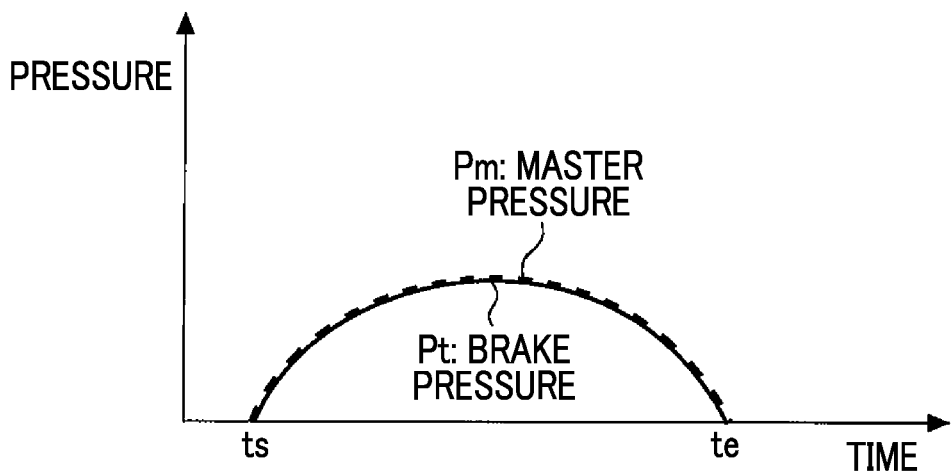
FIG. 5 is a timing chart that illustrates a second mode of the automatic braking control according to the embodiment of the present disclosure.

FIG. 5 is a timing chart that shows the master pressure Pm and the brake pressure Pt of the target wheel 10T in the second mode. A horizontal axis and a vertical axis of FIG. 5 represent the same as those in FIG. 4. Differing from the first mode, the second mode has a characteristic that the brake pressure Pt of the target wheel 10T is changed in an interlocking manner with the master pressure Pm.

Figure 6:
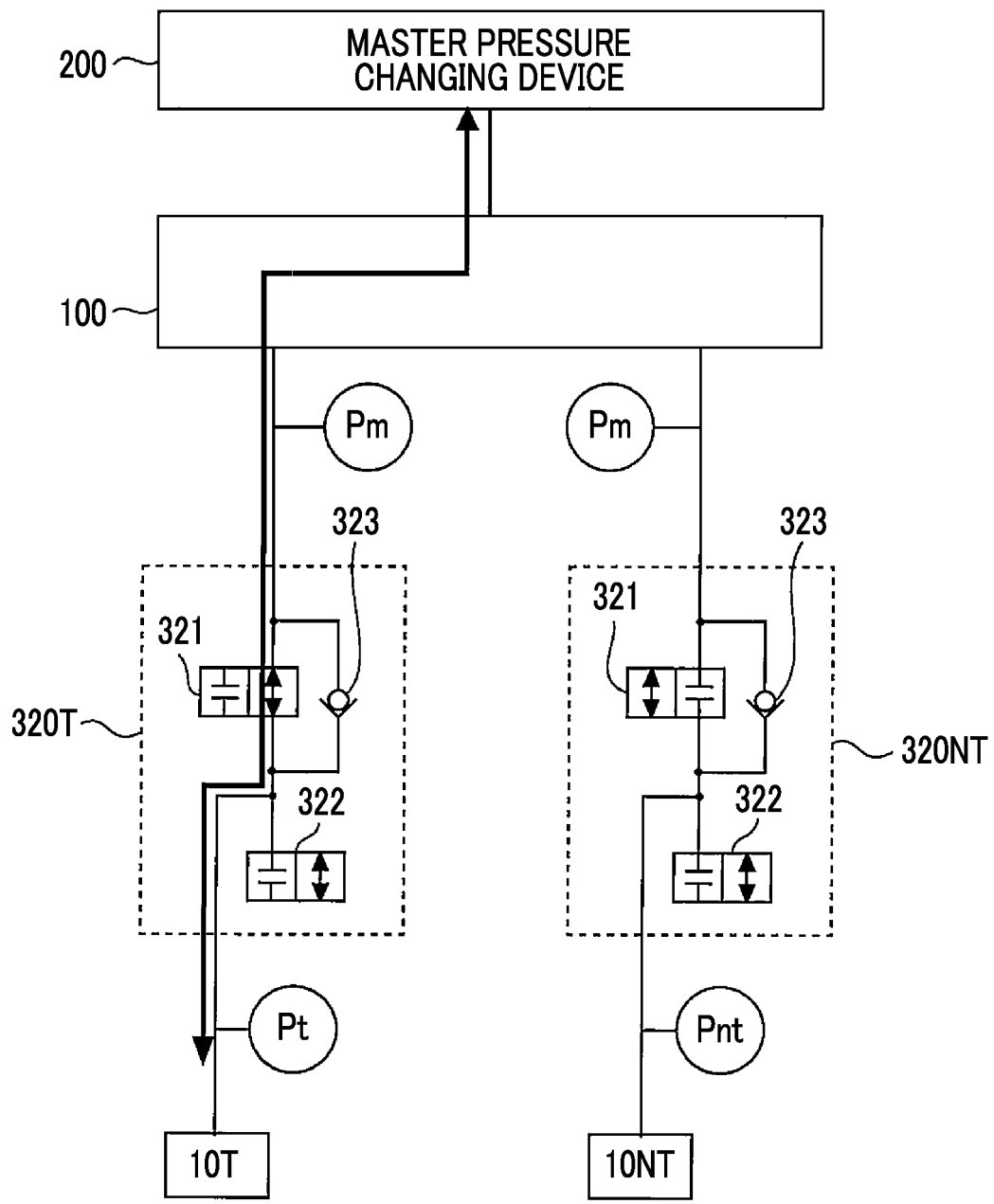
FIG. 6 is a conceptual diagram that illustrates the second mode of the automatic braking control according to the embodiment of the present disclosure.

A description will be made on a method for realizing the second mode with reference to FIG. 6. In regard to the target wheel 10T, the brake ECU 51 opens the booster valve 321 of the valve unit 320T and closes the reduction valve 322 of the valve unit 320T. When the booster valve 321 is of the NO type and the reduction valve 322 is of the NC type, the brake ECU 51 does not have to operate the valve unit 320T for the target wheel 10T. Meanwhile, in regard to the non-target wheel 10NT, the brake ECU 51 closes the booster valve 321 and the reduction valve 322 of the valve unit 320NT.

Based on the detection information received from the sensor group 70, the brake ECU 51 computes the target brake pressure of the target wheel 10T that is required for the automatic braking control. Then, the brake ECU 51 operates the master pressure changing device 200 such that the master pressure Pm obtains the target brake pressure. That is, the brake ECU 51 changes the master pressure Pm in a similar manner to the target brake pressure. At this time, as shown in FIG. 6, the brake pressure Pt, which is substantially equal to the master pressure Pm, is applied to the target wheel 10T through the valve unit 320T. As a result, the brake pressure Pt of the target wheel 10T is changed in the interlocking manner with the master pressure Pm. Meanwhile, the brake pressure Pnt of the non-target wheel 10NT is not changed and is maintained as is.

When the plural target wheels are present, the target brake pressure possibly differs by the target wheel. In this case, the brake ECU 51 operates the master pressure changing device 200 such that the master pressure Pm obtains a maximum value of the target brake pressure. Also, in this case, the brake pressure Pt of any of the target wheels 10T is changed in the interlocking manner with the master pressure Pm at each time point.

Just as described, the second mode has a characteristic that the brake pressure Pt of the target wheel 10T is changed in the interlocking manner with the master pressure Pm. That is, in the second mode, the brake ECU 51 changes the master pressure Pm by operating the master pressure changing device 200, and changes the brake pressure Pt of the target wheel 10T in a manner to interlock with the master pressure Pm.

4. Antilock Control

"Antilock control" as one type of the automatic braking control will be considered. The antilock control is the automatic braking control for preventing locking of the wheel during braking and is also referred to as antilock brake system (ABS) control.

The brake ECU 51 executes the antilock control by reducing the brake pressure Pt of the target wheel 10T. As described above, as means for changing the brake pressure Pt of the target wheel 10T, the two types of the first mode and the second mode are available. According to this embodiment, the brake ECU 51 uses the first mode or the second mode depending on whether the first mode is available.

As one example, a case where the pump unit 350 of the brake actuator 300 shown in FIG. 3 is not actuated normally will be considered. In this case, the pumps 351F, 351R are not actuated normally, and thus the brake fluid cannot return from the reservoir 330F, 330R to the input nodes 310F, 310R, respectively. Accordingly, after the reservoirs 330F, 330R become full, the brake pressures Pfl, Pfr, Prl, Prr cannot be reduced. This means that the antilock control in the first mode cannot be executed normally, that is, the first mode is unavailable.

For this reason, according to this embodiment, when detecting that the pump unit 350 is not actuated normally, the brake ECU 51 prohibits the first mode and permits the second mode. For example, the pump unit 350 has the self-detection function of detecting that the pumps 351F, 351R are not actuated normally. When detecting that the pumps 351F, 351R are not actuated normally, the pump unit 350 outputs an error signal to the brake ECU 51. In response to the error signal, the brake ECU 51 prohibits the first mode and permits the second mode.

As another example, the brake ECU 51 may prohibit the first mode and permit the second mode in response to a request from a system.

From a perspective of responsiveness of the brake pressures Pfl, Pfr, Prl, Prr, the first mode is superior to the second mode. Thus, when the first mode is available, as usual, the brake ECU 51 executes the antilock control in the first mode. In this sense, the first mode can be referred to as a "normal mode". Meanwhile, the second mode can be referred to as a "pseudo mode" or an "emergency mode".

Figure 7:
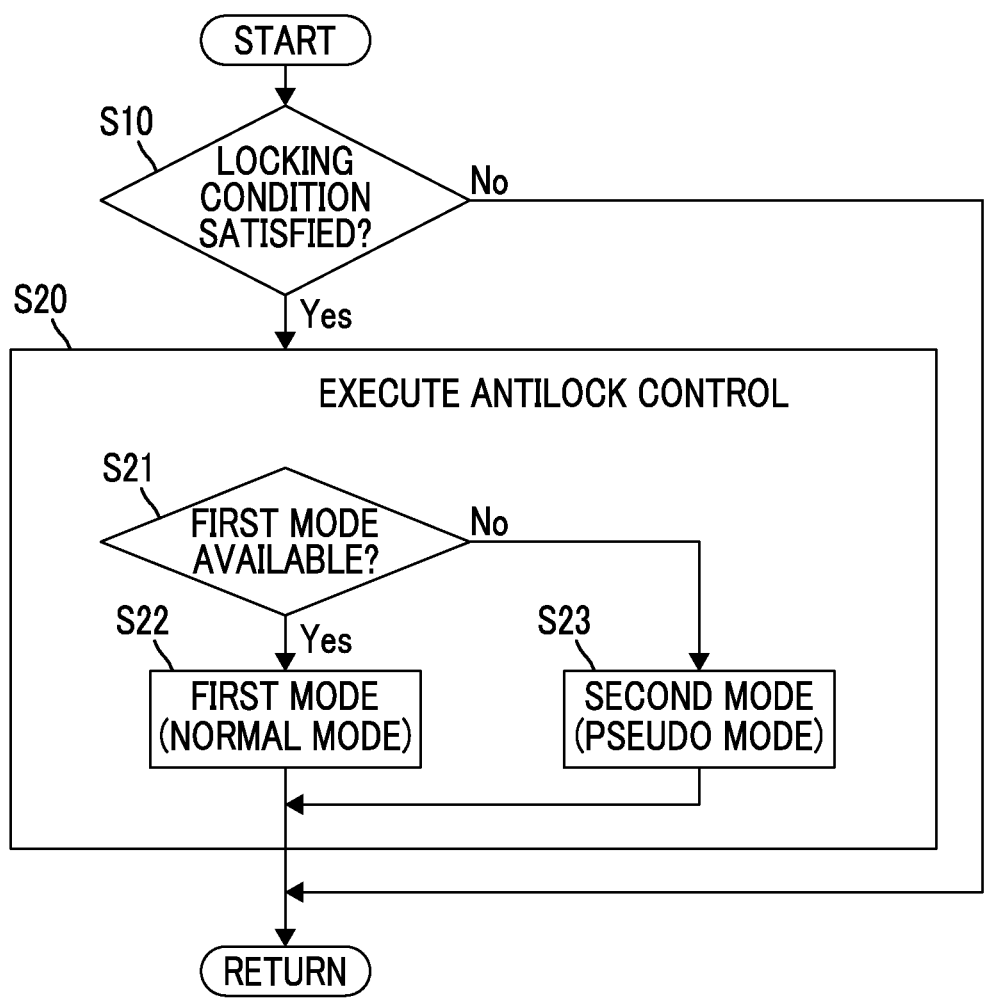
FIG. 7 is a flowchart that summarizes antilock control according to the embodiment of the present disclosure.

FIG. 7 is a flowchart that summarizes antilock control according to this embodiment. The brake ECU 51 repeatedly executes a processing flow shown in FIG. 7.

Step S10: The brake ECU 51 receives the detection information from the sensor group 70 to comprehend a travel state of the vehicle 1. Then, based on the travel state, the brake ECU 51 determines whether a "locking condition" is satisfied. Typically, the locking condition is that a slip amount or a slip rate of at least one wheel exceeds a threshold. If the locking condition is satisfied (step S10; Yes), the processing proceeds to step S20. On the other hand, if the locking condition is not satisfied (step S10; No), the processing in the current cycle is terminated.

Step S20: The brake ECU 51 executes the antilock control. At this time, the brake ECU 51 checks whether the first mode is available (step S21). If the first mode is permitted, that is, if the first mode is available, the brake ECU 51 executes the antilock control in the first mode (step S22). On the other hand, if the first mode is prohibited, that is, if the first mode is unavailable, the brake ECU 51 executes the antilock control in the second mode (step S23).

As it has been described so far, according to this embodiment, even when the first mode (the normal mode) is unavailable, the antilock control can be executed in the second mode (the pseudo mode). Thus, compared to the related art, an opportunity and a period to execute the antilock control are increased, and safety is improved.

It can also be said that this embodiment uses "redundancy" that both of the first mode and the second mode are present. That is, when the first mode is unavailable, the brake ECU 51 does not give up the execution of the antilock control and, instead of the first mode, can execute the antilock control in the second mode. This embodiment is particularly effective in such a situation where the antilock control cannot easily be abandoned (for example, during self-driving).

A case where the first mode becomes unavailable during self-driving of the vehicle 1 will be considered. Also in this case, the antilock control does not become void, and the antilock control in the second mode is effective. In this way, the safety is maintained, and thus self-driving can be continued. That is, there is no need to stop self-driving simply because the first mode is no longer available. According to this embodiment, continuity of self-driving can be improved.

5. Specific Example of Antilock Control in Pseudo Mode

Hereinafter, a detailed description will be made on the antilock control in the pseudo mode (the second mode). First, terms that will be used in the following description are defined. When a certain wheel shows a "lock sign", it means that the slip amount or the slip rate of said wheel exceeds the threshold. Based on the rotational speed of each of the wheels and the speed of the vehicle 1, the brake ECU 51 can compute the slip amount or the slip rate of each of the wheels. The rotational speeds of the wheels are respectively detected by the wheel speed sensors 71FL, 71FR, 71RL, 71RR. The speed of the vehicle 1 is detected by the vehicle speed sensor 74. Alternatively, the speed of the vehicle 1 may be computed from the rotational speeds of the front left wheel 10FL, the front right wheel 10FR, the rear left wheel 10RL, and the rear right wheel 10RR. The brake ECU 51 can determine whether the locking sign appears per wheel.

As shown in FIG. 7, if the locking condition is satisfied (step S10; Yes), the brake ECU 51 executes the antilock control. Typically, the locking condition is that the at least one wheel shows the locking sign. The brake ECU 51 at least sets the wheel that shows the locking sign as the target wheel 10T, and executes the antilock control.

As the simplest mode, it is considered to set all the wheels as the target wheels 10T. In this case, in regard to all the wheels, the brake ECU 51 opens the booster valves 321 and closes the reduction valves 322. When each of the booster valves 321 is of the NO type and each of the reduction valves 322 is of the NC type, the brake ECU 51 does not have to perform opening/closing operations of the valves and thus is favorable. Then, the brake ECU 51 reduces the brake pressures Pfl, Pfr, Prl, Prr of all the wheels by reducing the master pressure Pm.

Figure 8:
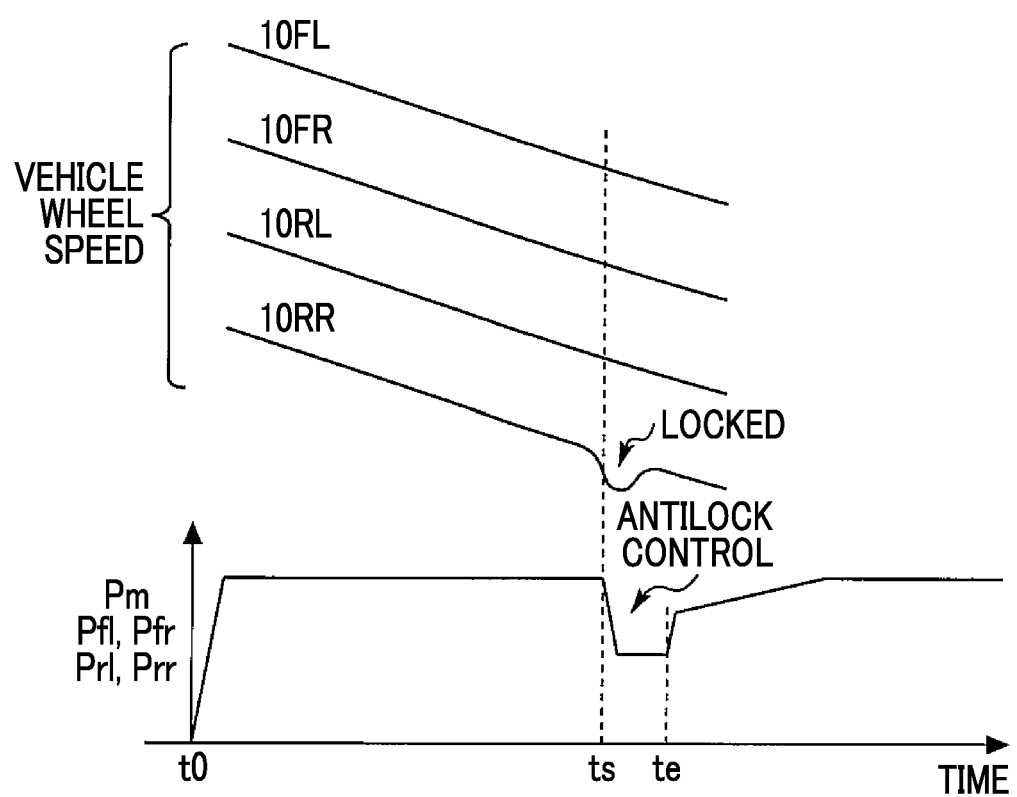
FIG. 8 is a timing chart of examples of temporal changes in a master pressure and a brake pressure according to the embodiment of the present disclosure.

FIG. 8 is a timing chart that shows one example of temporal changes in the master pressure Pm and the brake pressures Pfl, Pfr, Prl, Prr. A horizontal axis represents time, and a vertical axis represents pressure. FIG. 8 also shows a tendency of a wheel speed of each of the front left wheel 10FL, the front right wheel 10FR, the rear left wheel 10RL, and the rear right wheel 10RR.

At time to, the brake ECU 51 initiates normal braking control. The brake ECU 51 computes a target master pressure that corresponds to the target friction braking force, and boosts the master pressure Pm to the target master pressure. Corresponding to the boosted master pressure Pm, the brake pressures Pfl, Pfr, Prl, Prr are also boosted. In this way, the braking force is generated on each of the wheels, and the speed of the vehicle 1 is thereby reduced.

During braking, the rear right wheel 10RR shows the locking sign. The brake ECU 51 detects the locking sign of the right rear wheel 10RR and initiates the antilock control at time ts. More specifically, the brake ECU 51 reduces the master pressure Pm. Corresponding to the reduced master pressure Pm, all the brake pressures Pfl, Pfr, Prl, Prr are also reduced. The locking sign of the right rear wheel 10RR disappears when at least the brake pressure Prr is reduced.

The brake ECU 51 detects that the locking sign of the right rear wheel 10RR has disappeared, and terminates the antilock control at the time te. Then, the brake ECU 51 returns the master pressure Pm to the original master pressure Pm, which also returns the brake pressures Pfl, Pfr, Prl, Prr to the original brake pressures Pfl, Pfr, Prl, Prr.

Note that the present disclosure of the subject application is not limited to a case where all the wheels are set as the target wheels 10T. The wheel that shows the locking sign may be set as the target wheel 10T, and the wheels other than this may be set as the non-target wheels 10NT. In this case, as shown in FIG. 6, which has already been described, the brake ECU 51 closes the booster valve 321 of the non-target wheel 10NT. However, due to presence of the check valve 323, when the master pressure Pm is reduced to be lower than the brake pressure Pnt, the brake fluid flows through the check valve 323, and consequently the brake pressure Pnt is also reduced. In order not to change the brake pressure Pnt of the non-target wheel 10NT and to maintain the brake pressure Pnt as is in the pseudo mode, it is necessary to invalidate the check valve 323.

Figure 9:
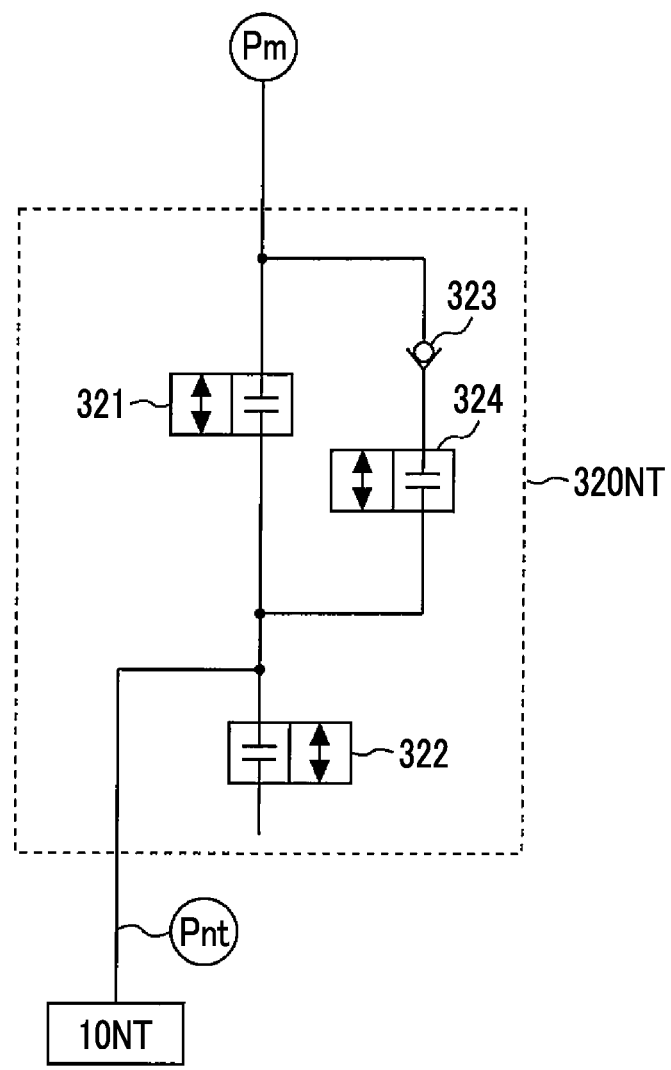
FIG. 9 is a view that illustrates a modified example of the brake actuator according to the embodiment of the present disclosure.

For example, as shown in FIG. 9, an invalidation valve 324 of the NO type that invalidates the check valve 323 is provided. When the antilock control in the pseudo mode is executed, the brake ECU 51 closes the booster valve 321 and the invalidation valve 324 for the non-target wheel 10NT. In this way, even when the master pressure Pm is reduced, the brake pressure Pnt of the non-target wheel 10NT is not changed and can be maintained as is. The brake ECU 51 can reduce the brake pressure Pt of the target wheel 10T only while maintaining the brake pressure Pnt of the non-target wheel 10NT as is.

A description will hereinafter be made on various examples of the "locking condition" that triggers initiation of the antilock control.

5-1. First Example

When either one of the rear wheels 10RL, 10RR is locked, an oversteer tendency is increased, and the vehicle 1 is likely to spin. Accordingly, when at least one of the rear wheels 10RL, 10RR shows the locking sign, the brake ECU 51 executes the antilock control. In this way, spinning can be avoided, and the stability can thereby be increased.

In addition, when either one of the front wheels 10FL, 10FR is locked, steering becomes less effective. Accordingly, when at least one of the front wheels 10FL, 10FR shows the locking sign, the brake ECU 51 executes the antilock control. In this way, a state where steering becomes less effective can be avoided, and the stability can thereby be increased.

5-2. Second Example

In a second example, a case where all the wheels are the target wheels 10T will be considered. In the cases where all the wheels are the target wheels 10T and the master pressure Pm is reduced, the brake pressure of the wheel that does not show the locking sign is also reduced. As a result, the braking force is reduced by the reduction in the brake pressure just as described. In view of the above, in the second example, the locking condition for the front wheels 10FL, 10FR is more relaxed than that in the first example.

More specifically, at a stage where only one of the front wheels 10FL, 10FR shows the locking sign, the brake ECU 51 does not execute the antilock control. When both of the front wheels 10FL, 10FR show the locking sign, the brake ECU 51 executes the antilock control. That is, as the locking condition, a condition that only one of the front wheels 10FL, 10FR shows the locking sign is not included, but a condition that both of the front wheels 10FL, 10FR show the locking sign is included. In this way, the opportunity of the antilock control, which is caused by the locking signs of the front wheels 10FL, 10FR, is reduced. As a result, the further large braking force can be secured.

The locking condition for the rear wheels 10RL, 10RR is the same as that in the first example. That is, when at least one of the rear wheels 10RL, 10RR shows the locking sign, the brake ECU 51 executes the antilock control regardless of the states of the front wheels 10FL, 10FR. In this way, spinning can be avoided. It can be said that the braking force is secured to be as large as possible while spinning is avoided in the second example.

5-3. Third Example

A third example is a modified example of the second example. In the third example, the brake ECU 51 changes the locking condition related to the front wheels 10FL, 10FR in accordance with whether the vehicle 1 travels straight or turns. Note that whether the vehicle 1 travels straight or turns can be determined on the basis of the detection information from the steering angle sensor 72, the lateral acceleration sensor 76, and the yaw rate sensor 78.

When the vehicle 1 travels straight, the braking force takes precedence over steerability. Thus, the locking condition is set to be the same as that in the second example. That is, as the locking condition, the condition that only one of the front wheels 10FL, 10FR shows the locking sign is not included, but the condition that both of the front wheels 10FL, 10FR show the locking sign is included.

Meanwhile, when the vehicle 1 turns, the steerability and turnability take precedence. Thus, the locking condition is set to be the same as that in the first example. Typically, the locking condition includes that the at least one of the front wheels 10FL, 10FR shows the locking sign.

Just as described, according to the third example, the locking condition for the front wheels 10FL, 10FR is set in accordance with a situation of the vehicle 1. In this way, a characteristic with a higher priority can be obtained in accordance with the situation of the vehicle 1.

5-4. Fourth Example

A fourth example is a further modified example of the third example. The locking condition of the case where the vehicle 1 travels straight is the same as that in the third example. Meanwhile, the locking condition of the case where the vehicle 1 turns differs by whether the wheel that shows the locking sign is an inner front wheel or an outer front wheel.

During turning, a larger load is applied to the outer front wheel than to the inner front wheel. When the outer front wheel is locked, a lateral force is significantly lost. Accordingly, when the outer front wheel shows a locking tendency, the brake ECU 51 executes the antilock control to maintain the turnability. Meanwhile, when only the inner front wheel shows the locking tendency, the braking force takes precedence, and the antilock control is not executed. That is, when the vehicle 1 turns, the locking condition does not include a condition that only the inner front wheel shows the locking sign, but includes a condition that the outer front wheel shows the locking sign.

Just as described, according to the fourth example, the turnability and the braking force during turning can be realized in a well-balanced manner.

5-5. Fifth Example

In a fifth example, a split μ road will be considered. On the split μ road, a friction coefficient (μ) differs between a side of the left wheels 10FL, 10RL and a side of the right wheels 10FR, 10RR. The brake ECU 51 can determine whether the vehicle 1 travels on the split μ road by contrasting the slip amount or the slip rate of the left wheels 10FL, 10FR and that of the right wheels 10FR, 10RR.

When the vehicle 1 travels on the split μ road, the wheel on the low μ side is likely to be locked. However, in the cases where all the wheels are the target wheels 10T and the master pressure Pm is reduced, the brake pressure on the high μ side is also reduced. As a result, the braking force is reduced by the reduction in the brake pressure just as described. In view of the above, in the fifth example, in order to secure the larger braking force as possible, the locking condition on the low μ side is more relaxed than that in the first example.

More specifically, at a stage where only the wheels on the low μ side show the locking sign, the brake ECU 51 does not execute the antilock control. When at least one of the wheels on the high μ side shows the locking sign, the brake ECU 51 executes the antilock control. That is, the locking condition does not include a condition that only the wheels on the low μ side show the locking sign, but includes a condition that the wheel on the high μ side shows the locking sign. In this way, the further large braking force can be secured.

Note that, when a difference in the braking force between the left wheels 10FL, 10RL and the right wheels 10FR, 10RR is increased, the yaw rate is increased, and the vehicle 1 is likely to spin. Accordingly, the brake ECU 51 monitors the yaw rate on the basis of the detection information from the yaw rate sensor 78. When the yaw rate exceeds a reference value, the brake ECU 51 operates the master pressure changing device 200 to reduce the master pressure Pm. In this way, the brake pressures of all the wheels as the target wheels 10T are also reduced. When the brake pressures are reduced, the difference in the braking force between the left wheels 10FL, 10RL and the right wheels 10FR, 10RR is reduced. As a result, the yaw rate is reduced, and the stability on the split μ road is secured.

6. Cooperation with Automatic Drive Device

Figure 10:
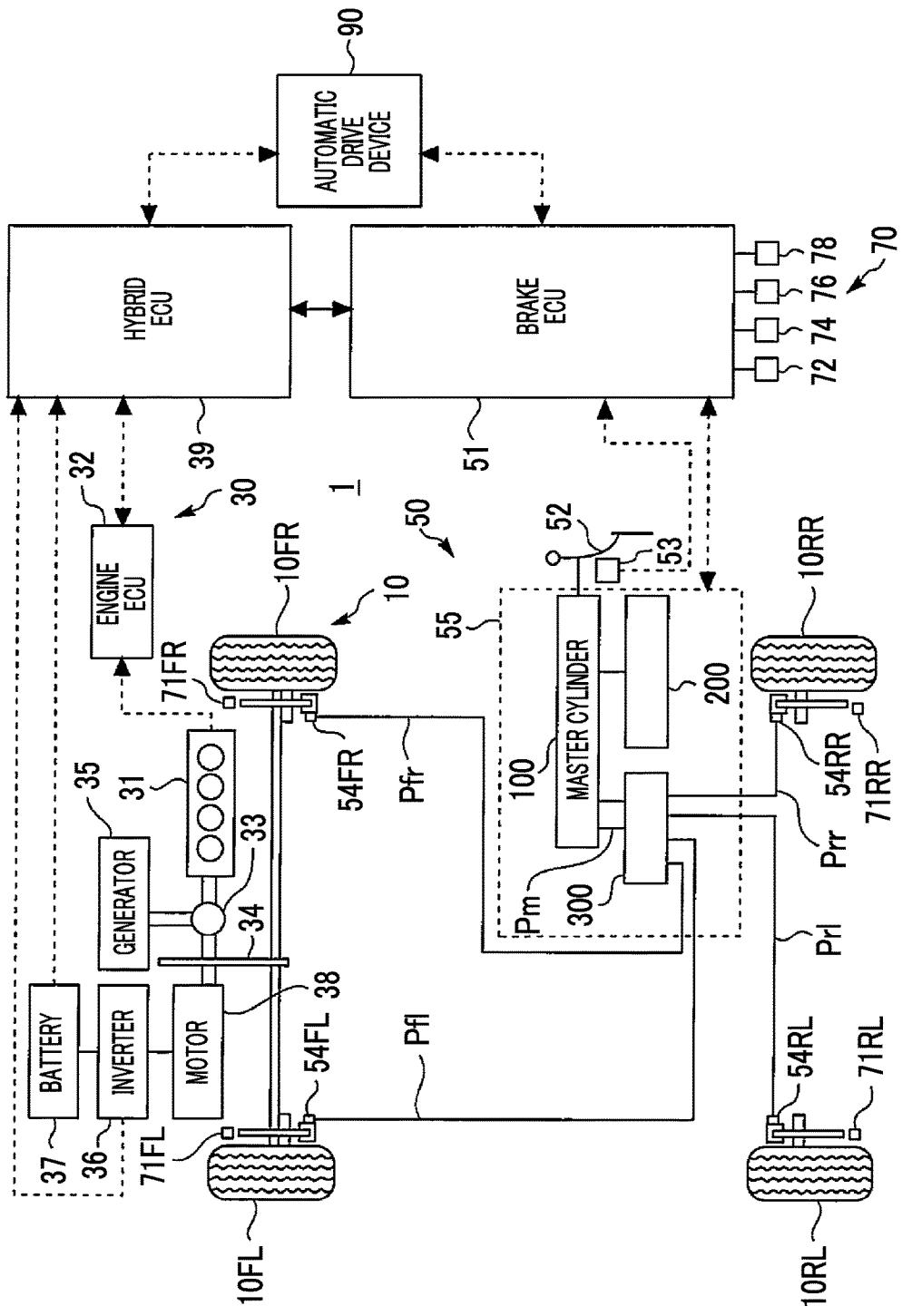
FIG. 10 is a schematic view of another configuration example of the vehicle according to the embodiment of the present disclosure.

FIG. 10 schematically shows a configuration of the vehicle 1 on which an automatic drive device 90 is mounted. The automatic drive device 90 executes automatic drive control. For example, the automatic drive device 90 executes track control that makes the vehicle 1 automatically travel along a travel plan.

When the automatic drive device 90 executes the track control, it is preferred to secure the steerability so as to prevent deviation of the vehicle 1 from a travel plan route. Accordingly, as the locking condition of a case where the automatic drive device 90 executes the track control, the above-described first example is preferred. That is, when at least one of the front wheels 10FL, 10FR shows the locking sign, the brake ECU 51 executes the antilock control. In this way, the steerability is secured, and the track control can favorably be executed.

From a perspective of responsiveness of the brake pressure during the antilock control, the normal mode is superior to the pseudo mode. In addition, in the pseudo mode, the braking force in the case where all the wheels are the target wheels 10T is smaller than that in the normal mode. From what has been described so far, in the case of the pseudo mode, a time required to avoid a collision is possibly extended from the case of the normal mode.

In view of the above, when executing antilock control in the pseudo mode, the brake ECU 51 informs the automatic drive device 90 of "use of the pseudo mode" and requests at least one of the following (1) to (4) to the automatic drive device 90. (1) Increase a distance between vehicles: the collision can easily be avoided by increasing the distance between the vehicles in advance. (2) Reduce the vehicle speed: the collision can easily be avoided by reducing the vehicle speed in advance. (3) Notify the driver: when being notified of the use of the pseudo mode, the driver can recognize a cause of a driving sense that differs from that in the case of the normal mode, and thus can feel safe. (4) Prohibit resuming of the automatic drive control: the automatic drive device 90 continues the automatic drive control of the current time; however, once stopping the automatic drive control, the automatic drive device 90 does not resume the automatic drive control. In this way, a risk of not being able to use the normal mode is avoided.

Just as described, according to this embodiment, the automatic drive control, for which the pseudo mode is taken into consideration, is realized.

What is claimed is:

1. A brake control apparatus for a vehicle comprising:
   a master cylinder configured to output a brake fluid at a master pressure;
   a master pressure changing device configured to change the master pressure irrespective of an operation of a brake pedal;
   a brake actuator configured to supply the brake fluid output from the master cylinder to a wheel cylinder of each of wheels and that can control a brake pressure of the brake fluid supplied to the wheel cylinder; and
   a control unit configured to execute antilock control of preventing locking of a target wheel by reducing the brake pressure of the target wheel irrespective of the operation of the brake pedal during braking, wherein
   modes of the antilock control include a normal mode and a pseudo mode, and
   the control unit is configured to
      in the normal mode, operate the brake actuator to obtain a target value of the brake pressure of the target wheel,
      in the pseudo mode, operate the master pressure changing device such that the master pressure obtains the target value, and change the brake pressure of the target wheel such that the brake pressure of the target wheel and the mater pressure are substantially a same pressure over time, and
      execute the antilock control in the pseudo mode when the normal mode is unavailable.

2. The brake control apparatus for the vehicle according to claim 1 wherein
   the brake actuator includes a pump, and
   the control unit is configured to execute the antilock control in the pseudo mode when the pump cannot be used.

3. The brake control apparatus for the vehicle according to claim 1 wherein
   the brake actuator includes: an input node that receives the brake fluid output from the master cylinder; a booster valve that is provided between the input node and the wheel cylinder for each of the wheels; a reduction valve that is provided between the wheel cylinder and a reservoir for each of the wheels; and a pump that is configured to causes the brake fluid to return from the reservoir to the input node.

4. The brake control apparatus for the vehicle according to claim 3 wherein in the pseudo mode, all the wheels are the target wheels, and the control unit is configured to reduce the brake pressures by opening the booster valves and closing the reduction valves for all the wheels and reducing the master pressure.

5. The brake control apparatus for the vehicle according to claim 4 wherein
the booster valve is of a normally open type, and the reduction valve is of a normally closed type.

6. The brake control apparatus for the vehicle according to claim 3 wherein
a wheel other than the target wheel is a non-target wheel, and
in the pseudo mode, the control unit is configured to reduce the brake pressure of the target wheel while maintaining the brake pressure of the non-target wheel, by opening the booster valve for the target wheel, closing the reduction valve for the target wheel, closing the booster valve for the non-target wheel, and reducing the master pressure.

7. The brake control apparatus for the vehicle according to claim 6 wherein
the control unit is configured to set at least one of the wheels as the target wheel and execute the antilock control when a slip amount or a slip rate of the at least one of the wheels exceeds a threshold.

8. The brake control apparatus for the vehicle according to claim 1 wherein
in the pseudo mode, the control unit is configured to set all the wheels as the target wheel and execute the antilock control when a locking condition is satisfied, the locking condition is that at least one of the wheels shows a locking sign, and the locking sign is that a slip amount or a slip rate exceeds a threshold.

9. The brake control apparatus for the vehicle according to claim 8 wherein
the locking condition includes that at least one rear wheel shows the locking sign.

10. The brake control apparatus according to claim 9 wherein
the locking condition includes that at least one front wheel shows the locking sign.

11. The brake control apparatus for the vehicle according to claim 9 wherein
the locking condition does not include that only one of right and left front wheels shows the locking sign and the locking condition further includes that both of the right and left front wheels show the locking sign.

12. The brake control apparatus for the vehicle according to claim 9 wherein
when the vehicle travels straight, the locking condition does not include that only one of right and left front wheels shows the locking sign and the locking condition includes that both of the right and left front wheels show the locking sign, and
when the vehicle turns, the locking condition includes that at least one of the right and left front wheels shows the locking sign.

13. The brake control apparatus for the vehicle according to claim 9 wherein
when the vehicle travels straight, the locking condition does not include that only one of right and left front wheels shows the locking sign and the locking condition includes that both of the right and left front wheels show the locking sign, and when the vehicle turns, the locking condition does not include that only an inner wheel of the right and left front wheels shows the locking sign and the locking condition includes that an outer wheel of the right and left front wheels shows the locking sign.

14. The brake control apparatus for the vehicle according to claim 9 wherein
the vehicle includes an automatic drive device configured to execute automatic drive control, and
when the automatic drive device executes track control of the vehicle, the locking condition includes that at least one of front wheels shows the locking sign.

15. The brake control apparatus for the vehicle according to claim 8 wherein
when the vehicle travels on a split $\mu$ road, the locking condition does not include that only the wheel on a low $\mu$ side shows the locking sign and the locking condition includes that the wheel on a high $\mu$ side shows the locking sign.

16. The brake control apparatus for the vehicle according to claim 15 wherein
the control unit is configured to:
monitor a yaw rate of the vehicle; and
operate the master pressure changing device to reduce the master pressure when the yaw rate exceeds a reference value.

17. The brake control apparatus for the vehicle according to claim 1 wherein
the vehicle includes an automatic drive device configured to execute automatic drive control, and
when executing the antilock control in the pseudo mode, the control unit is configured to request at least one of increasing a distance between vehicles, reducing a vehicle speed, notifying a driver, and prohibiting resuming of the automatic drive control to the automatic drive device.

18. A brake control apparatus for a vehicle comprising:
a master cylinder configured to output a brake fluid at a master pressure;
a master pressure changing device configured to change the master pressure irrespective of an operation of a brake pedal;
a brake actuator configured to supply the brake fluid output from the master cylinder to a wheel cylinder of each of wheels and control a brake pressure of the brake fluid supplied to the wheel cylinder; and
a control unit configured to execute antilock control of preventing locking of a target wheel by reducing the brake pressure of the target wheel irrespective of the operation of the brake pedal during braking, the control unit being configured to
execute the antilock control in a pseudo mode when a pump provided in the brake actuator is unavailable, and
operate the master pressure changing device such that the master pressure obtains a target value of the brake pressure of the target wheel, and change the brake pressure of the target wheel such that the brake pressure of the target wheel and the mater pressure are substantially a same pressure over time, with the master pressure in the pseudo mode.

* * * * *